(12) United States Patent
Takeba

(10) Patent No.: US 8,281,497 B2
(45) Date of Patent: Oct. 9, 2012

(54) LAMP HOLDER COMPRISING LAMP-CLAMPING PINS AND BEING MOUNTED AT A VARIABLE ROTATION ANGLE ON THE LAMP HOUSING SURFACE

(75) Inventor: Mitsuhiro Takeba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 12/738,882

(22) PCT Filed: Jun. 18, 2008

(86) PCT No.: PCT/JP2008/061149
§ 371 (c)(1),
(2), (4) Date: Apr. 20, 2010

(87) PCT Pub. No.: WO2009/057345
PCT Pub. Date: May 7, 2009

(65) Prior Publication Data
US 2010/0283937 A1  Nov. 11, 2010

(30) Foreign Application Priority Data

Oct. 30, 2007  (JP) ................................. 2007-281839

(51) Int. Cl.
  *G02F 1/1335* (2006.01)
  *G02F 1/1333* (2006.01)
  *F21V 19/02* (2006.01)
  *F21S 4/00* (2006.01)
  *G09F 13/04* (2006.01)
  *G09F 13/08* (2006.01)
  *G09F 13/10* (2006.01)

(52) U.S. Cl. .............. 34/70; 349/58; 362/220; 362/225; 362/97.2; 362/97.4

(58) Field of Classification Search .................... 349/61, 349/70, 58; 362/225, 220, 97.1, 97.2, 97.4
See application file for complete search history.

(56) References Cited

U.S. PATENT DOCUMENTS 7,540,649 B2 *   6/2009   Satoh et al. .................... 362/630
7,594,747 B2 *   9/2009   Tsai et al. ...................... 362/634
(Continued)

FOREIGN PATENT DOCUMENTS

JP            06-075216 A      3/1994
(Continued)

OTHER PUBLICATIONS

Official Communication issued in corresponding Chinese Patent Application No. 200880114294.3, mailed on Sep. 15, 2011.
Official Communication issued in International Patent Application No. PCT/JP2008/061149, mailed on Jul. 15, 2008.

*Primary Examiner* — Mark Robinson
*Assistant Examiner* — Dennis Y Kim
(74) *Attorney, Agent, or Firm* — Keating & Bennett, LLP

(57) ABSTRACT

A lamp holder 20 for use mounted on a lamp housing 4a surface having a flat shape to hold a plurality of tubular lamps 5 while arranging the lamps in parallel on the lamp housing surface providing a predetermined interval between the lamps includes a holder board 21, and three lamp-clamping pins 22a, 22b and 22c that are provided in a protruding manner at each end portion of the holder board, the lamp-clamping pins at each end portion of the holder board being disposed to have a positional relation such that they are capable of clamping the lamp that passes through them, and the lamp holder being arranged to provide, by being mounted at a variable rotation angle on the lamp housing surface, an interval of a desired size between the lamps.

15 Claims, 12 Drawing Sheets

U.S. PATENT DOCUMENTS

| | | | |
|---|---|---|---|
| 8,115,889 B2 * | 2/2012 | Kim | 349/64 |
| 2006/0066774 A1 * | 3/2006 | Kim et al. | 349/65 |
| 2006/0268542 A1 * | 11/2006 | Chen et al. | 362/225 |
| 2007/0121318 A1 * | 5/2007 | Nanbu | 362/228 |
| 2010/0232140 A1 * | 9/2010 | Takeba | 362/97.1 |
| 2011/0310589 A1 * | 12/2011 | He et al. | 362/97.1 |

FOREIGN PATENT DOCUMENTS

| | | |
|---|---|---|
| JP | 2001-210126 A | 8/2001 |
| JP | 2005-203154 A | 7/2005 |
| JP | 2008-066283 A | 3/2008 |
| JP | 2008-129200 A | 6/2008 |

* cited by examiner

LAMP HOLDER COMPRISING LAMP-CLAMPING PINS AND BEING MOUNTED AT A VARIABLE ROTATION ANGLE ON THE LAMP HOUSING SURFACE

BACKGROUND OF THE INVENTION

1. Field of the Invention

The present invention relates to a backlight unit for use disposed behind a display panel to illuminate the display panel with light, and specifically relates to a backlight unit for use disposed behind a display panel to illuminate the display panel with light that includes on its lamp housing surface a plurality of tubular lamps that are a light source held by lamp holders while the tubular lamps are arranged in parallel provided with predetermined intervals therebetween.

2. Description of the Related Art

In recent years, liquid crystal display devices are in widespread use as flat-screen display devices. Among them, liquid crystal display devices used for television devices and other display devices each include a liquid crystal display panel arranged to display an image, and a backlight unit disposed behind the liquid crystal display panel. The backlight unit includes a plurality of tubular lamps such as CCFLs (Cold Cathode Fluorescent Lamp) that are alight source, and is arranged to illuminate the liquid crystal display panel from behind with light emitted from the lamps while controlling the properties of the emitted light. The light illuminating the display panel passes through the display panel, making an image displayed visible on a front side of the liquid crystal display panel.

FIG. 10 is a view showing a schematic configuration of a conventional liquid crystal display device. As shown in FIG. 10, a liquid crystal display device 60 includes a liquid crystal display panel 61 arranged to display an image, and a backlight unit 62 disposed behind the display panel 61.

The backlight unit 62 includes a backlight chassis 63 substantially in the shape of a box of low height, and a plurality of CCFLs 64 arranged in parallel in the backlight chassis 63, a reflection sheet 65, and optical sheets 66. Light emitted from the CCFLs 64 passes, together with light reflected by the reflection sheet 65, through the optical sheets 66 and the display panel 61, and is visually perceived from the observer's side. The optical sheets 66 are arranged to adjust the properties of the light entering the display panel 61 from the CCFLs 64.

FIG. 11 is a front view of the backlight unit 62. As shown in FIG. 11, the CCFLs 64 are arranged in parallel such that the intervals provided between the adjacent CCFLs 64 are narrow at the middle portion of the backlight chassis 63 and become wider toward each top and bottom end of the backlight chassis 63 in order to maximize the luminance at the middle portion of a screen of the display panel 61 and gradually decrease the luminance toward the ends of the screen, which is disclosed in Japanese Patent Publication Laid-Open No. Hei06-75216. This arrangement is used because the number of the CCFLs 64 can be reduced compared with a conventional arrangement of CCFLs while the luminance of the screen is not visually perceived to be irregular with human eyes.

In this arrangement, the CCFLs 64 are held by lamp holders 67 and 68, as disclosed in Japanese Patent Publication Laid-Open No. 2001-210126, on a lamp housing surface of the backlight chassis 63 as shown in FIG. 11. Having a long tubular length, the CCFLs 64 cannot be positioned with assured positioning accuracy only by being held at their both ends by electrode holders 69, so that the CCFLs 64 are held also at their midway by the lamp holders 67 and 68.

In this arrangement, the lamp holders 67 and 68 that are of two different kinds and shown respectively in FIGS. 12A and 12B are used in order to provide narrow intervals between the adjacent CCFLs 64 at the middle portions of the backlight chassis 63 and wide intervals between the adjacent CCFLs 64 at each top and bottom end of the backlight chassis 63. The lamp holder 67 includes a holder board 70 having a rectangular shape, and two lamp holding members 72 disposed at both end portions of the holder board 70. The lamp holder 68 includes a holder board 71 having a rectangular shape, and two lamp holding members 72 disposed at both end portions of the holder board 71. The lamp holding members 72 each have the shape of a ring with an opening atop thereof so as to hold the CCFL 64.

In addition, the lamp holders 67 and 68 each include a sheet supporting pin 73 having a stick shape. The sheet supporting pins 73 are provided in a protruding manner between the lamp holding members 72 from the holder boards 70 and 71, and each have a length such that the optical sheets 66 are made apart at a predetermined distance from the reflection sheet 65. Having such a configuration, the sheet supporting pins 73 can prevent the optical sheets 66, which are disposed top of the backlight unit 62, from being deformed to bend downward, minimizing occurrence of luminance irregularity on the display panel 61. The lamp holders 67 and 68 include mounting members 74 under the lamp holding members 72, and are arranged to be fixed to the backlight chassis 63 by engaging the mounting members 74 in mounting openings 75 provided in the reflection sheet 65 and the backlight chassis 63.

However, there is a problem that manufacturing costs are not easily reduced because the components that constitute the backlight unit 62 increase in number since the two different kinds of lamp holders 67 and 68 that have different distances between the lamp holding members 72 as shown in FIGS. 12A and 12B need to be used in order to provide the narrow intervals between the adjacent CCFLs 64 at the middle portions of the backlight chassis 63 and the wide intervals between the adjacent CCFLs 64 at each top and bottom end of the backlight chassis 63.

SUMMARY OF THE INVENTION

In order to overcome the problems described above, preferred embodiments of the present invention provide a lamp holder, a backlight unit and a display device, with the use of which, intervals of various sizes can be provided between lamps arranged in parallel on a lamp housing surface of the backlight unit only by varying rotation angles of the lamp holders that are of one kind in accordance with desired sizes of intervals between the adjacent lamps, so that lamp holders of various kinds as conventionally required to provide intervals of various sizes between the adjacent lamps become unnecessary, and thus a reduction of the kinds of the lamp holders can be achieved. Examples of providing intervals of various sizes between the adjacent lamps include providing a narrow interval between the adjacent lamps at a middle portion of the lamp housing surface and a wide interval between the adjacent lamps at each top and bottom end of the lamp housing surface.

To achieve the objects and in accordance with the purpose of the present invention, a lamp holder for use mounted on a lamp housing surface having a flat shape to hold a plurality of tubular lamps that are a light source while arranging the tubular lamps in parallel on the lamp housing surface providing a predetermined interval between the lamps includes a holder board, and three or more lamp-clamping pins that are provided in a protruding manner at each end portion of the holder board, the three or more lamp-clamping pins at each end portion of the holder board being disposed to have a positional relation such that they are capable of clamping the lamp that passes through them, and the lamp holder being arranged to provide, by being mounted at a variable rotation angle on the lamp housing surface, an interval of a desired size between the lamps.

In this case, it is preferable that the lamp-clamping pins provided in the protruding manner at each end portion of the holder board are disposed to have a positional relation such that they are located at three vertices of a triangle, or a positional relation such that they are located at four vertices of a substantial rhombus. It is also preferable that the lamp-clamping pins each have an hourglass shape, and are arranged to clamp the lamp that passes through them at their hourglass waists. It is also preferable that the lamp holder further includes a mounting member via which the lamp holder is mounted on the lamp housing surface, the mounting member being disposed at a rotation center of the holder board.

In another aspect of the present invention, a backlight unit for use disposed behind a display panel having an image display region to illuminate the display panel with light includes a lamp housing surface having a flat shape, a plurality of tubular lamps that are a light source arranged in parallel on the lamp housing surface, and a lamp holder that is mounted on the lamp housing surface and arranged to hold the plurality of tubular lamps while arranging the tubular lamps in parallel on the lamp housing surface providing a predetermined interval between the lamps, the lamp holder including a holder board, and three or more lamp-clamping pins that are provided in a protruding manner at each end portion of the holder board, the three or more lamp-clamping pins at each end portion of the holder board being disposed to have a positional relation such that they are capable of clamping the lamp that passes through them, and the lamp holder being arranged to provide, by being mounted at a variable rotation angle on the lamp housing surface, an interval of a desired size between the lamps.

In this case, it is preferable that the lamp-clamping pins provided in the protruding manner at each end portion of the holder board are disposed to have a positional relation such that they are located at three vertices of a triangle, or a positional relation such that they are located at four vertices of a substantial rhombus. It is also preferable that the lamp-clamping pins each have an hourglass shape, and are arranged to clamp the lamp that passes through them at their hourglass waists. It is also preferable that the lamp holder further includes a mounting member via which the lamp holder is mounted on the lamp housing surface, the mounting member being disposed at a rotation center of the holder board.

Yet, in another aspect of the present invention, a display device includes a display panel having an image display region, and a backlight unit that is disposed behind the display panel and arranged to illuminate the display panel with light, the backlight unit including a lamp housing surface having a flat shape, a plurality of tubular lamps that are a light source arranged in parallel on the lamp housing surface, and a lamp holder that is mounted on the lamp housing surface and arranged to hold the plurality of tubular lamps while arranging the tubular lamps in parallel on the lamp housing surface providing a predetermined interval between the lamps, the lamp holder including a holder board, and three or more lamp-clamping pins that are provided in a protruding manner at each end portion of the holder board, the three or more lamp-clamping pins at each end portion of the holder board being disposed to have a positional relation such that they are capable of clamping the lamp that passes through them, and the lamp holder being arranged to provide, by being mounted at a variable rotation angle on the lamp housing surface, an interval of a desired size between the lamps.

In this case, it is preferable that the lamp-clamping pins provided in the protruding manner at each end portion of the holder board are disposed to have a positional relation such that they are located at three vertices of a triangle, or a positional relation such that they are located at four vertices of a substantial rhombus. It is also preferable that the lamp-clamping pins each have an hourglass shape, and are arranged to clamp the lamp that passes through them at their hourglass waists. It is also preferable that the lamp holder further includes a mounting member via which the lamp holder is mounted on the lamp housing surface, the mounting member being disposed at a rotation center of the holder board.

As described above, the lamp holder, backlight unit and display device according to the preferred embodiments of the present invention each have the configuration that the three or more lamp-clamping pins are provided in the protruding manner at each end portion of the holder board of the lamp holder for use mounted on the lamp housing surface having the flat shape to hold the plurality of tubular lamps that are the light source while arranging them in parallel on the lamp housing surface providing the predetermined interval between the lamps, the three or more lamp-clamping pins at each end portion of the holder board being disposed to have the positional relation such that they are capable of clamping the lamp that passes through them, the lamp holder being arranged to provide, by being mounted at a variable rotation angle on the lamp housing surface, a desired size of interval between the lamps; therefore, the size of the interval between the lamps to be held arranged in parallel on the lamp housing surface can be varied in accordance with a desired size of interval between the lamps only by varying rotation angle of the lamp holder.

To be specific, even in a case where a narrow interval between the adjacent lamps at a middle portion of the lamp housing surface and a wide interval between the adjacent lamps at each top and bottom end of the lamp housing surface are required, intervals of various sizes can be provided between the lamps by the lamp holders that are of one kind. Consequently, lamp holders of various kinds as conventionally required become unnecessary, so that a reduction of the kinds of lamp holders can be achieved, allowing manufacturing costs to be reduced more than ever.

If the lamp holder, backlight unit and display device according to the preferred embodiments of the present invention each also have the configuration that the lamp-clamping pins provided in the protruding manner at each end portion of the holder board are disposed to have the positional relation such that they are located at three vertices of a triangle, or the positional relation such that they are located at four vertices of a substantial rhombus, the lamp-clamping pins at each end portion of the holder board can be easily disposed so as to have the positional relation such that they are capable of clamping the lamp that passes through them. If the lamp holder, backlight unit and display device according to the preferred embodiments of the present invention each also have the configuration that the lamp-clamping pins each have an hourglass shape, and are arranged to clamp the lamp that passes through them at their hourglass waists, the lamp-clamping pins can easily clamp the lamp that passes through them. If the lamp holder, backlight unit and display device according to the preferred embodiments of the present invention each also have the configuration that the lamp holder further includes the mounting member via which the lamp holder is mounted on the lamp housing surface, the mounting member being disposed at the rotation center of the holder board, the number of a mounting opening, which is provided on the lamp housing surface so as to correspond to the mounting member, can be reduced, allowing manufacturing costs to be reduced.

DETAILED DESCRIPTION OF PREFERRED EMBODIMENTS

Figure 1:
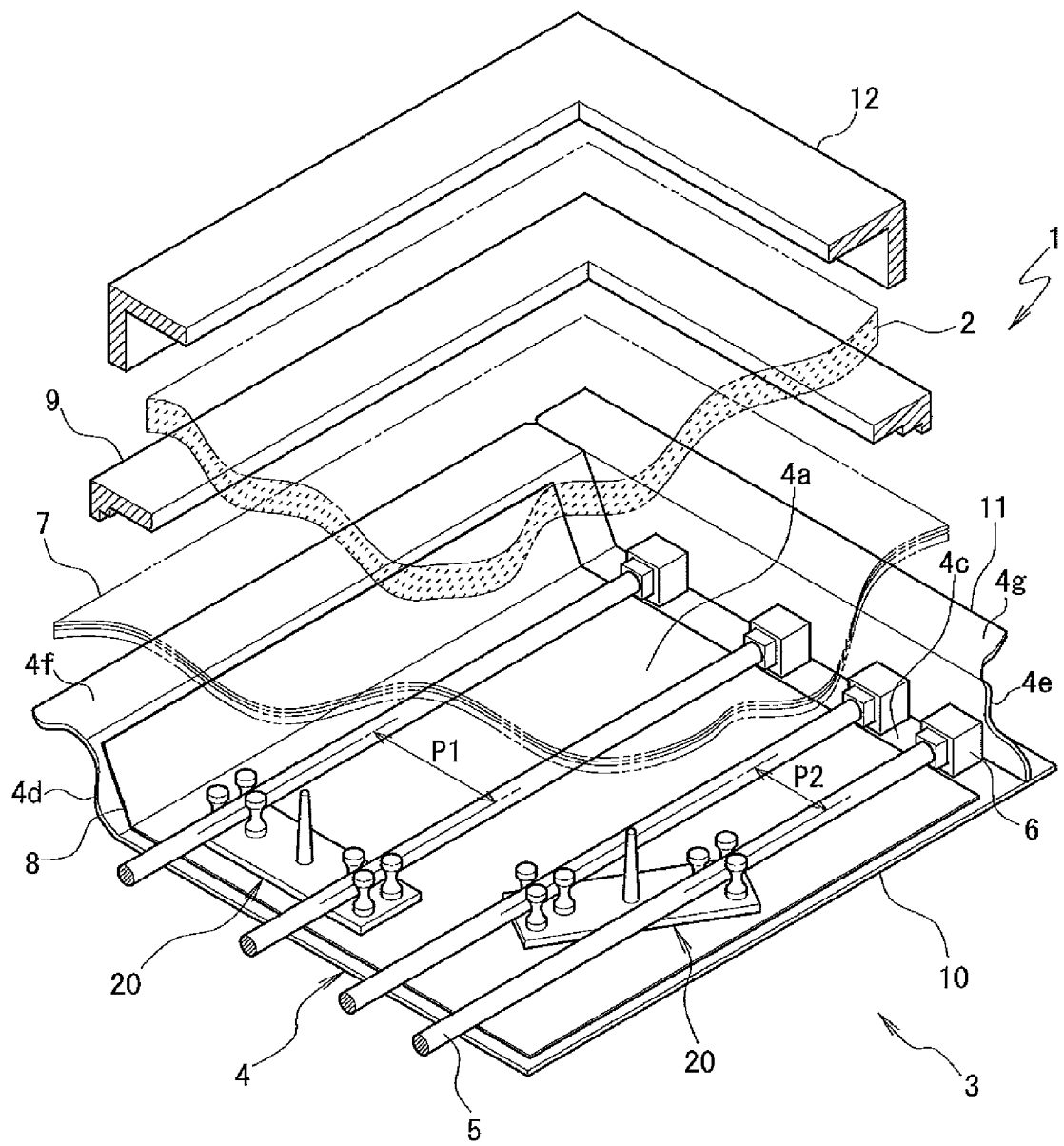
FIG. 1 is an exploded perspective view showing a schematic configuration of a liquid crystal display device according to a first preferred embodiment of the present invention.
Figure 2:
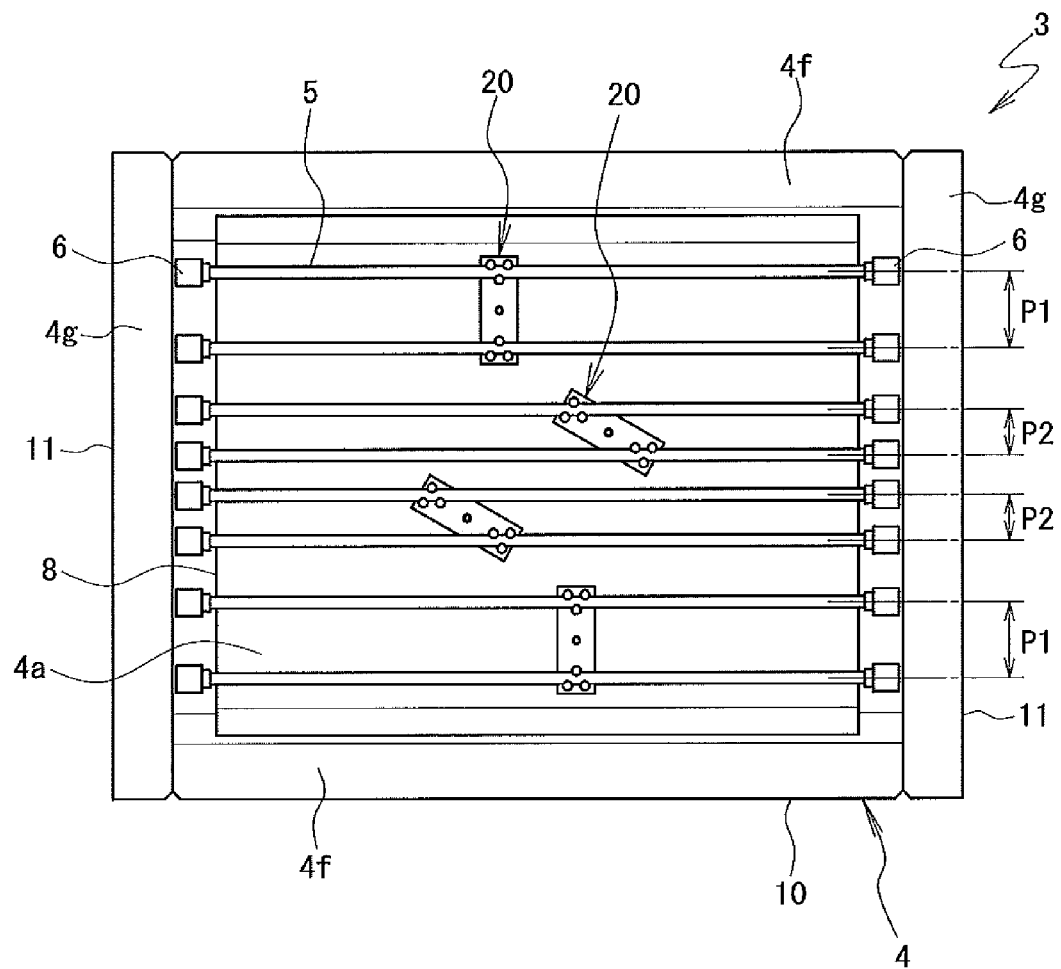
FIG. 2 is a front view of a backlight unit included in the liquid crystal display device shown in FIG. 1.
Figure 3A:
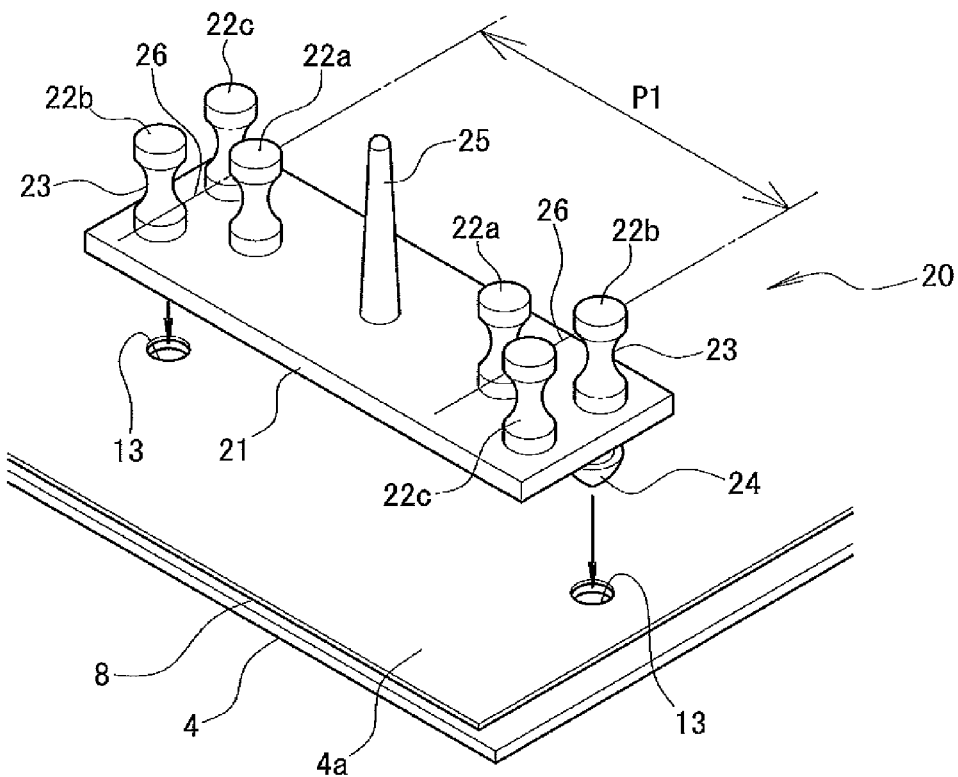
FIG. 3A is an external perspective view showing the state of a lamp holder to be mounted on a lamp housing surface such that the lamp holder holds two CCFLs providing an interval P1 between them.
Figure 3B:
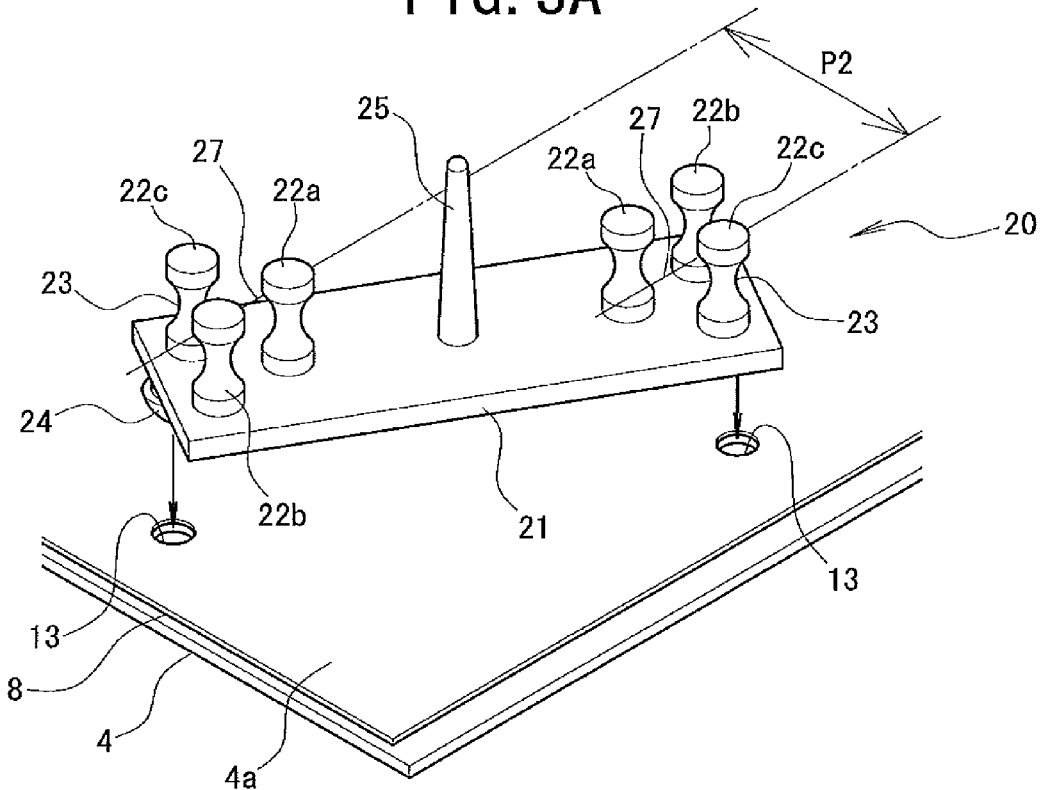
FIG. 3B is an external perspective view showing the state of the lamp holder to be mounted on the lamp housing surface such that the lamp holder holds two CCFLs providing an interval P2 between them.

A detailed description of preferred embodiments of the present invention will now be provided with reference to the accompanying drawings. First, the first preferred embodiment of the present invention is described referring to FIGS. 1 to 4B. FIG. 1 is an exploded perspective view showing a part of a liquid crystal display device according to the first preferred embodiment of the present invention. FIG. 2 is a front view of a backlight unit. FIGS. 3A and 3B are external perspective views showing a lamp holder. It is to be noted that the view shown in FIG. 1 is an exploded perspective view showing the upper right half of the backlight unit shown in FIG. 2, and a corresponding portion of a liquid crystal display panel.

As shown in FIG. 1, a liquid crystal display device 1 includes a liquid crystal display panel 2, and a backlight unit 3 disposed behind the display panel 2. The display panel 2 includes a parallelly opposed pair of a thin film transistor (TFT) substrate and a color filter (CF) substrate, the pair having a given space therebetween in which a liquid crystal is sealed in. The backlight unit 3 is arranged to illuminate the display panel 2 with light from behind. The light illuminating the display panel 2 passes through the display panel 2, making an image displayed visible on a front side of the display panel 2.

The backlight unit 3 includes a backlight chassis 4 substantially in the shape of a box of low height including a lamp housing surface 4a, and eight tubes of straight tubular CCFLs (Cold Cathode Fluorescent Lamp) 5 that are a light source and are arranged in parallel on the lamp housing surface 4a. In the preferred embodiment of the present invention, the CCFLs 5 are arranged in parallel such that the intervals provided between the adjacent CCFLs 5 are narrow at the middle portion of the backlight chassis 4 and become gradually wider toward each top and bottom end of the backlight chassis 4 as shown in FIG. 2. The CCFLs 5 are each held at their both ends by electrode holders 6 and thereby secured to the backlight chassis 4.

Optical sheets 7 are provided above the CCFLs 5. The optical sheets 7 are defined by a stack of optical members having a plate or sheet shape such as a diffusion plate, a diffusion sheet, a lens sheet and a polarizing reflection sheet, and are arranged to control the properties of light entering the display panel 2 from the CCFLs 5 and light reflected from a reflection sheet 8. The optical sheets 7 are secured to the backlight chassis 4 by a frame 9 having the shape of a square with an opening while supported on support surfaces 4f and 4g of the backlight chassis 4.

The backlight chassis 4 includes a bottom portion 4c that defines the lamp housing surface 4a, sidewall portions 4d on the longer sides, and sidewall portions 4e on the shorter sides. The bottom portion 4c and the sidewall portions 4d constitute a member 10, which is prepared by subjecting a metal plate material to plate metal processing. The sidewall portions 4e constitute members 11, which are preferably molded of a resin. The backlight chassis 4 has a configuration such that the support surfaces 4f and 4g extend outward from the upper ends of the sidewall portions 4d and 4e. The optical sheets 7 are supported on the support surfaces 4f and 4g, and secured to the backlight chassis 4 by the frame 9. The display panel 2 is placed on the upper surface of the frame 9 and secured to the frame 9 by a bezel 37 having the shape of a square with an opening. The reflection sheet 8 having a white color is laid under the CCFLs 5, and arranged to reflect light that is emitted from the CCFLs 5 and illuminates the reflection sheet 8, toward the display panel 2.

It is to be noted that an inverter circuit board (not shown) arranged to generate high pulse voltage to drive the CCFLs 5, and a control circuit board (not shown) arranged to control the display panel 2 are provided behind the backlight chassis 4.

The CCFLs 5 are held to be secured to the lamp housing surface 4a by lamp holders 20 that are arranged to hold the CCFLs 5 at their midway as shown in FIG. 1, in addition to by the electrode holders 6.

In this preferred embodiment of the present invention, by rotating the lamp holders 20 mounted on the lamp housing surface 4a ninety degrees to be in a longitudinal direction or sixty degrees leftward further from the longitudinal direction, the backlight unit 3 shown in FIG. 2 can have a configuration such that the first and second CCFLs 5 and the seventh and eighth CCFLs 5 from the top end of the backlight chassis 4 are held in pairs by the lamp holders 20 mounted rotated ninety degrees to be in the longitudinal direction while arranged in parallel provided with intervals P1 therebetween, and the third and fourth CCFLs 5 and the fifth and sixth CCFLs 5 from the top end are held in pairs by the lamp holders 20 mounted rotated sixty degrees leftward further from the longitudinal direction while arranged in parallel provided with intervals P2 therebetween.

FIG. 3A is an external perspective view showing the state of the lamp holder 20 to be mounted on the lamp housing surface 4a such that the lamp holder 20 holds the two CCFLs 5 providing the interval P1 between them. FIG. 3B is an external perspective view showing the state of the lamp holder 20 to be mounted on the lamp housing surface such that the lamp holder 20 holds the two CCFLs 5 providing the interval P2 between them.

The lamp holder 20 is preferably made from a synthetic resin of a white or transparent color, and includes a holder board 21 having a rectangular shape, and three lamp-clamping pins 22a, 22b and 22c that are provided in a manner protruding upward at each end portion of the holder board 21. The lamp-clamping pins 22a, 22b and 22c each have an hourglass shape, and their hourglass waists 23 each have an arc shape.

The lamp-clamping pins 22a, 22b and 22c at each end portion are located at the three vertices of a triangle. In this case, the lamp-clamping pins 22a, 22b and 22c at one end portion and the lamp-clamping pins 22a, 22b and 22c at the other end portion are located symmetrical about the rotation center of the holder board 21. In this case, the lamp-clamping pins 22b and 22c located at the vertices of the base of the triangle at each end portion are located outer than the lamp-clamping pins 22a.

The lamp holder 20 includes mounting members 24 that are provided in a manner protruding downward at both end portions of the holder board 21. Mounting openings 13 corresponding to the mounting members 24 of the holder board 21 are provided in the reflection sheet 8 and the backlight chassis 4. The mounting members 24 of the lamp holder 20 are engaged in the mounting openings 13, whereby the lamp holder 20 is secured to the lamp housing surface 4a.

In addition, the lamp holder 20 includes a sheet supporting pin 25 having a stick shape. The sheet supporting pin 25 has a given length and is provided in a manner protruding upward at a center portion of the holder board 21. Having such a configuration, the sheet supporting pin 25 can prevent the optical sheets 7, which are disposed above the sheet supporting pin 25, from being deformed to bend downward, and thereby occurrence of luminance irregularity can be minimized.

The lamp holder 20 includes a space 26 formed between the lamp-clamping pins 22b and 22a and between the lamp-clamping pins 22c and 22a at the end portion shown in the upper left portion of FIG. 3A, and a space 26 formed between the lamp-clamping pins 22c and 22a and between the lamp-clamping pins 22b and 22a at the end portion shown in the lower right portion of FIG. 3A, each space 26 being arranged such that a CCFL 5 is inserted and led therethrough. Thus, the CCFLs 5 that are inserted and led through the spaces 26 are clamped by the lamp-clamping pins 22a, 22b and 22c.

In FIG. 3A, the distance between the spaces 26 is established to be equal to the interval P1, so that two CCFLs 5 to be inserted and led through the spaces 26 are held while arranged in parallel provided with the interval P1 therebetween as shown in FIGS. 1 and 2. Thus, the lamp holder 20 can hold the two CCFLs 5 while arranging them in parallel providing the interval P1 between them.

In addition, the lamp holder 20 includes a space 27 formed between the lamp-clamping pins 22b and 22c and between the lamp-clamping pins 22a and 22c at the end portion shown in the slightly lower left portion of FIG. 3B, and a space 27 formed between the lamp-clamping pins 22a and 22c and between the lamp-clamping pins 22b and 22c at the end portion shown in the slightly upper right portion of FIG. 3B, each space 27 being arranged such that a CCFL 5 is inserted and led therethrough. Thus, the CCFLs 5 that are inserted and led through the spaces 27 are clamped by the lamp-clamping pins 22a, 22b and 22c.

In FIG. 3B, the distance between the spaces 27 is established to be equal to the interval P2 that is shorter than the above-described interval P1, so that two CCFLs 5 to be inserted and led through the spaces 27 are held while arranged in parallel provided with the interval P2 therebetween as shown in FIGS. 1 and 2. Thus, the lamp holder 20 can hold the two CCFLs 5 while arranging them in parallel providing the interval P2 between them.

Figure 12A:
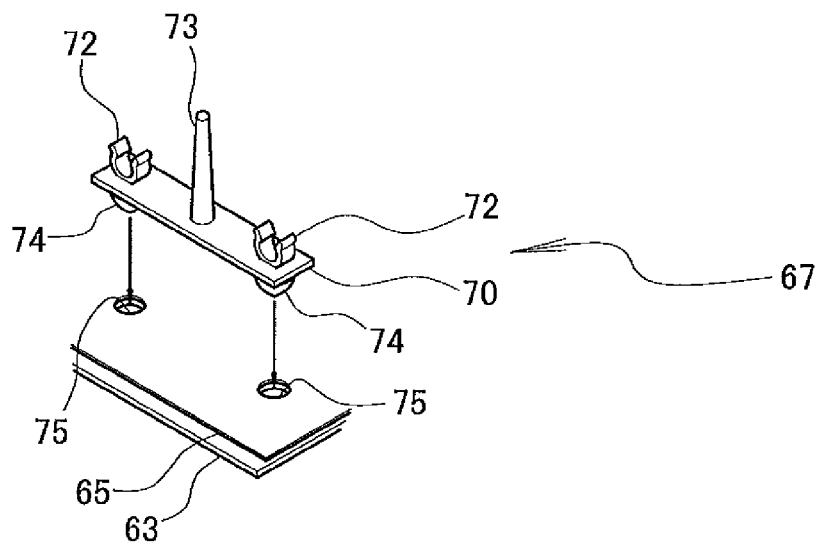
FIG. 12A is an external perspective view showing a schematic configuration of a lamp holder that is configured to hold two CCFLs providing a predetermined interval between the CCFLs.
Figure 12B:
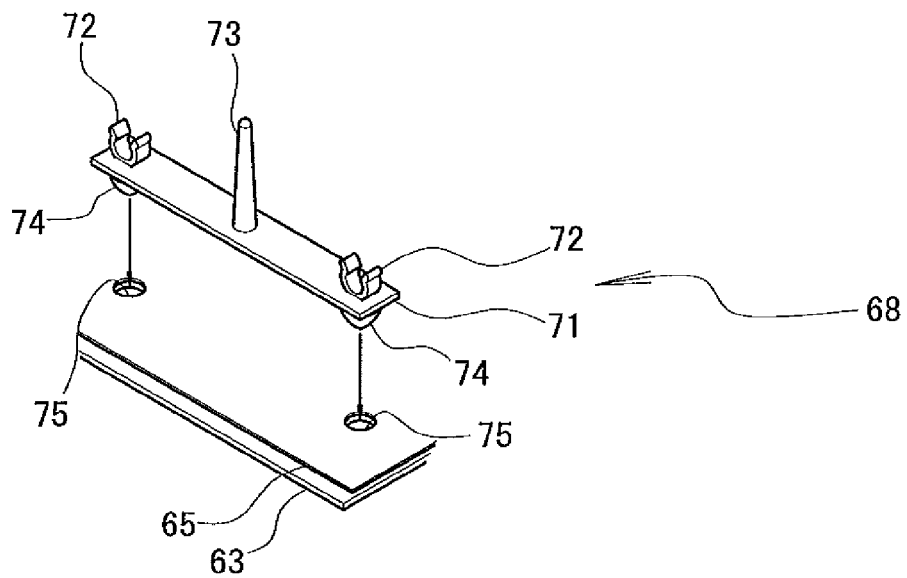
FIG. 12B is an external perspective view showing a schematic configuration of a lamp holder that is configured to hold two CCFLs providing a predetermined interval between the CCFLs, the predetermined interval being wider than the predetermined interval provided by the lamp holder shown in FIG. 12A.

As described above, only by rotating the lamp holders 20 in accordance with the desired sizes of intervals between the CCFLs 5 held on the lamp housing surface 4a, various sizes of intervals can be provided between the CCFLs 5 by the lamp holders 20. Conventionally, lamp holders 67 and 68 that are of two different kinds and shown respectively in FIGS. 12A and 12B are required to hold the CCFLs 5 while arranging them in parallel providing the interval 1 and interval 2 between them; however, the above-described lamp holders 20 that are of one kind can suffice for the conventional lamp holders of two different kinds. Consequently, a reduction of the kinds of the lamp holders can be achieved, allowing manufacturing costs to be reduced more than ever.

Figure 4A:
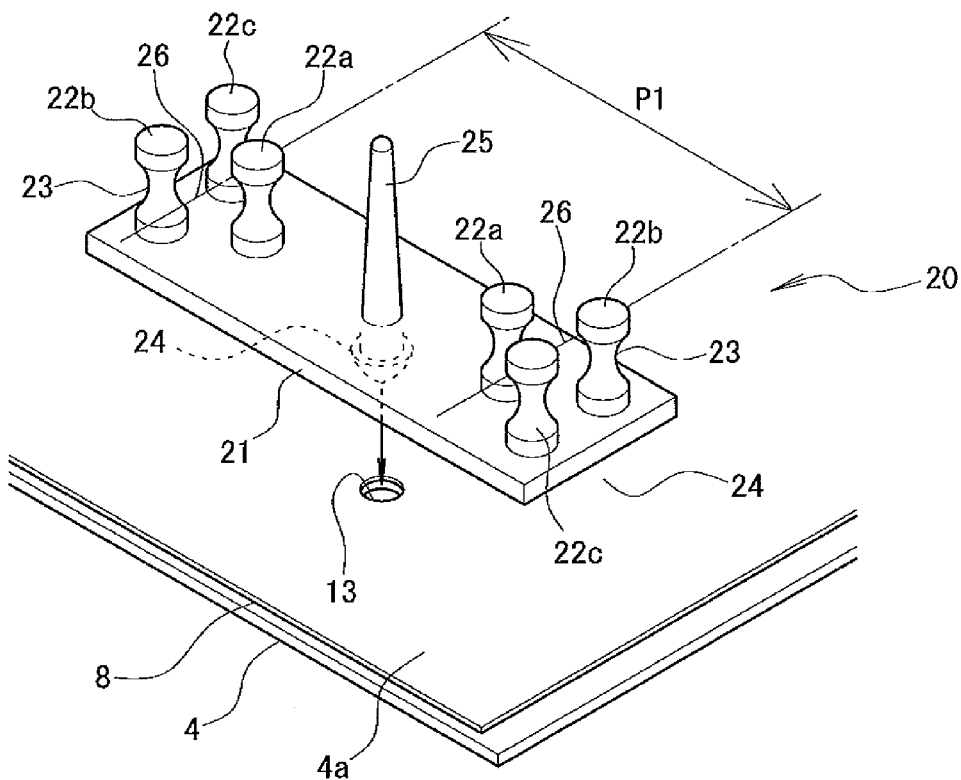
FIG. 4A is an external perspective view showing the state of the lamp holder to be mounted on a lamp housing surface such that the lamp holder holds two CCFLs providing the interval P1 between them, where the lamp holder has a mounting member that is different from that of the lamp holder shown in FIG. 3A.
Figure 4B:
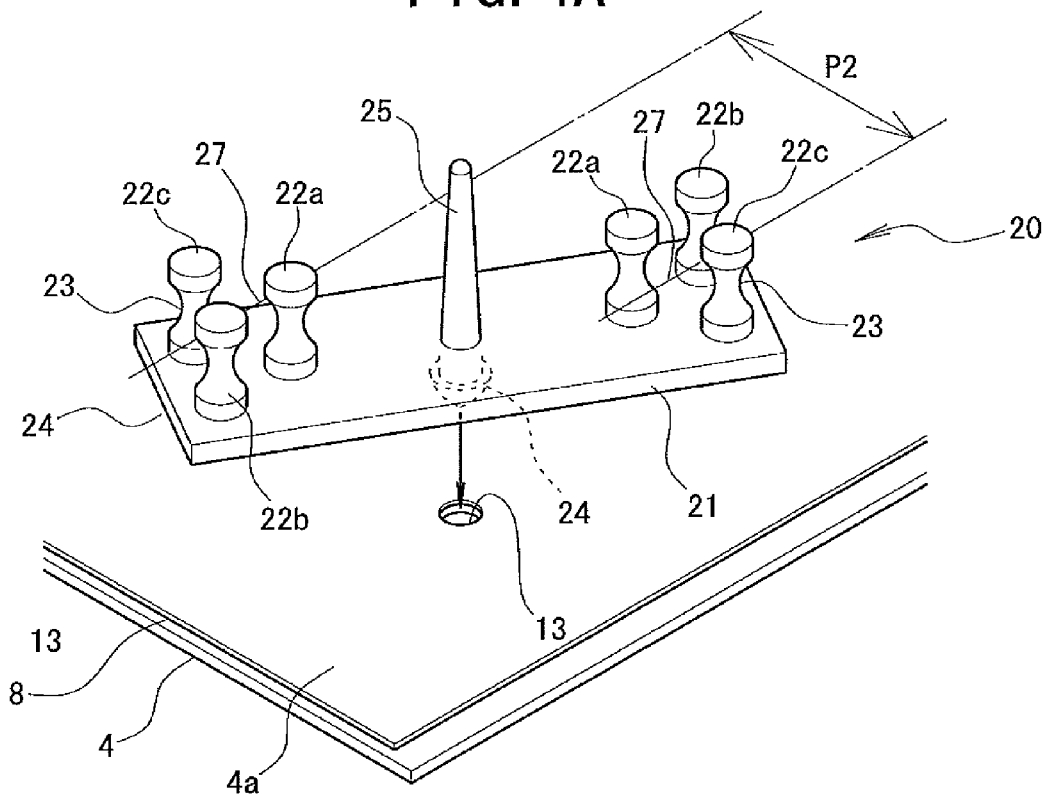
FIG. 4B is an external perspective view showing the state of the lamp holder to be mounted on the lamp housing surface such that the lamp holder holds two CCFLs providing the interval P2 between them, where the lamp holder has the mounting member that is different from that of the lamp holder shown in FIG. 3B.

It is to be noted that the mounting member 24 included in the lamp holder 20 shown in FIGS. 4A and 4B is disposed at the rotation center of the lamp holder 20, the disposed position of the mounting member 24 being different from that of the lamp holder 20 shown in FIGS. 3A and 3B. If the lamp holder 20 has such a configuration, the number of the mounting openings 13, which are provided in the lamp housing surface 4a so as to correspond to the mounting members 24, can be reduced, allowing manufacturing costs to be reduced.

Figure 5A:
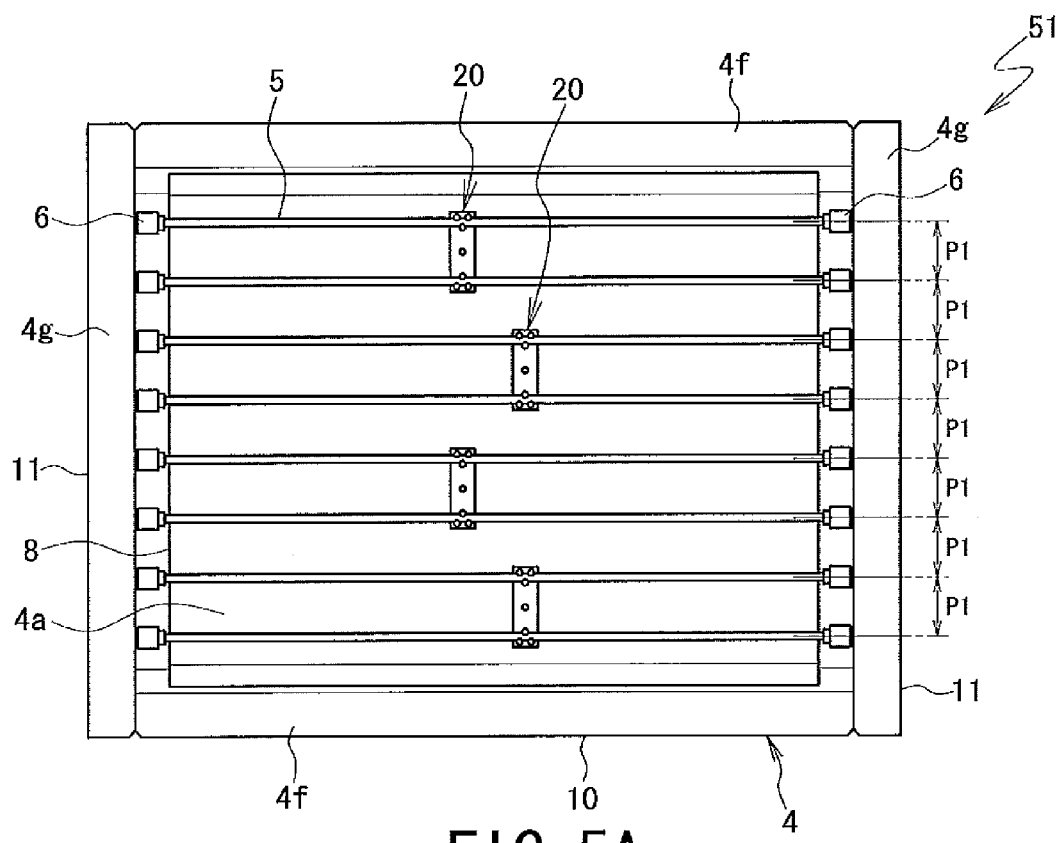
FIG. 5A is a front view of a backlight unit according to a second preferred embodiment of the present invention, where the CCFLs are arranged in parallel provided with the intervals P1 of a size therebetween.
Figure 5B:
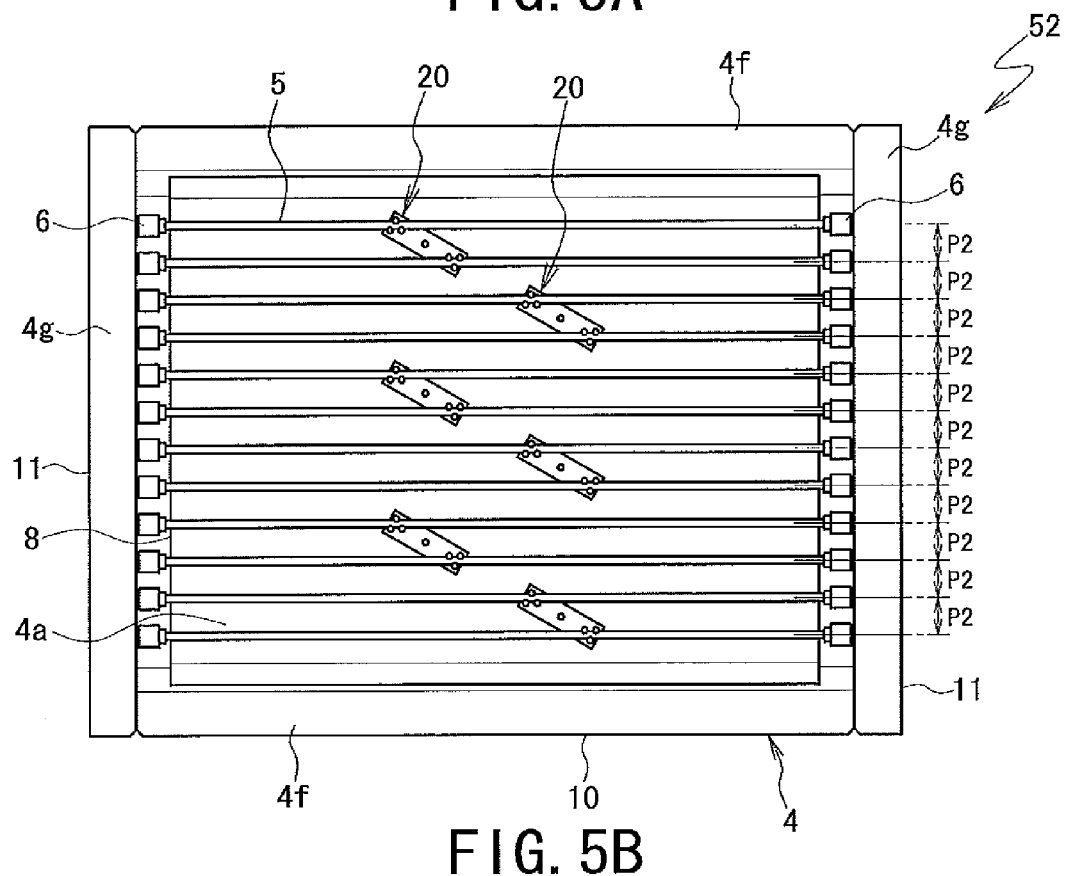
FIG. 5B is a front view of a backlight unit according to another second preferred embodiment of the present invention, where the CCFLs are arranged in parallel provided with the intervals P2 of a size therebetween.

Next, a description of a second preferred embodiment of the present invention will be provided referring to FIGS. 5A and 5B. It is to be noted that, in this description, explanations of the same configurations as those in the first preferred embodiment are omitted, and different respects are explained mainly, providing the same reference numerals as those in the first preferred embodiment to the same components.

While described in the first preferred embodiment of the present invention is an application of the lamp holders 20 to the use in the backlight unit 3 where the CCFLs 5 are arranged in parallel on the lamp housing surface 4a such that the intervals provided between the adjacent CCFLs 5 are narrow at the middle portion of the backlight chassis 4 and become gradually wider toward each top and bottom end of the backlight chassis 4, described in the second preferred embodiment of the present invention is another application of the lamp holders 20 to the use in backlight units 51 and 52 where the CCFLs 5 are arranged in parallel on the lamp housing surface 4a provided with intervals of a size therebetween as shown in FIGS. 5A and 5B.

The backlight unit 51 shown in FIG. 5A has a configuration such that the CCFLs 5 are arranged in parallel provided with the intervals P1 of a size therebetween, and all of the lamp holders 20 are disposed rotated ninety degrees to be in the longitudinal direction. The backlight unit 52 shown in FIG. 5B has a configuration such that the CCFLs 5 are arranged in parallel provided with the intervals P2 of a size therebetween, and all of the lamp holders 20 are disposed rotated sixty degrees leftward from the longitudinal direction.

Thus, the lamp holders 20 can be used in both of the backlight unit 51 shown in FIG. 5A having the configuration that the intervals P1 of a size are provided between the CCFLs 5, and the backlight unit 52 shown in FIG. 5B having the configuration that the intervals P2 of a size are provided between the CCFLs 5. Consequently, the lamp holders 20 that are of a kind can be used in backlight units having configurations different from each other in the size of the intervals provided between the CCFLs 5, allowing manufacturing costs to be reduced.

Next, a description of a third preferred embodiment of the present invention will be provided referring to FIGS. 6A and 6B and FIGS. 7A and 7B. It is to be noted that, in this description, explanations of the same configurations as those in the first preferred embodiment are omitted, and different respects are explained mainly, providing the same reference numerals as those in the first preferred embodiment to the same components.

Figure 6A:
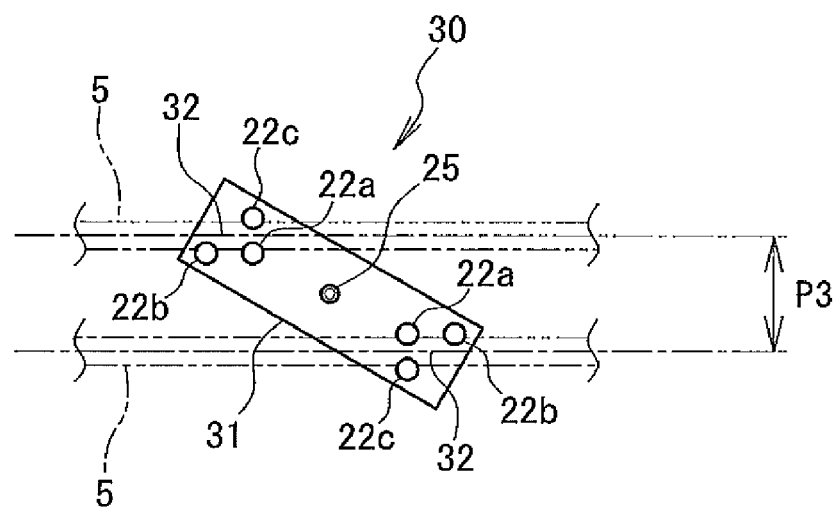
FIG. 6A is a front view of a lamp holder according to a third preferred embodiment of the present invention, where the lamp holder is configured to hold two CCFLs, providing an interval P3 between them.
Figure 6B:
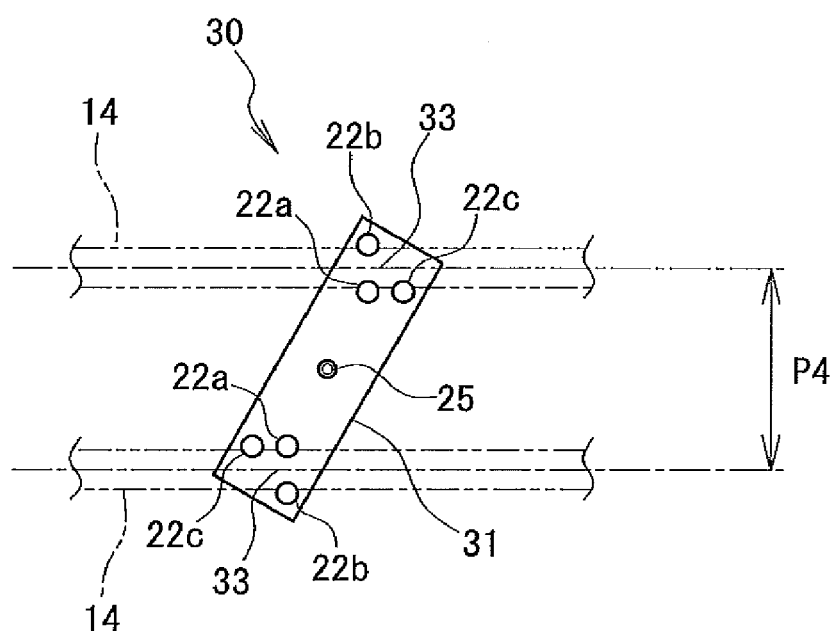
FIG. 6B is a front view of the lamp holder, where the lamp holder is configured to hold two CCFLs providing an interval P4 between them.

A lamp holder 30 shown in FIGS. 6A and 6B, which includes a holder board 31 having a rectangular shape, and three lamp-clamping pins 22a, 22b and 22c that are provided in a manner protruding upward at each end portion of the holder board 31, is slightly different from the lamp holder 20 according to the first preferred embodiment of the present invention in terms of the disposition of the lamp-clamping pins 22a, 22b and 22c. In the lamp holder 30, the disposition of the lamp-clamping pins 22a, 22b and 22c at each end portion is such that the lamp-clamping pins 22b are located slightly outer than the other lamp-clamping pins 22a and 22c.

Also in the lamp holder 30, the lamp-clamping pins 22a, 22b and 22c at one end portion and the lamp-clamping pins 22a, 22b and 22c at the other end portion are located symmetrical about the rotation center of the holder board 31, and the lamp-clamping pins 22b and 22c located at the vertices of the base of the triangle at each end portion are located outer than the lamp-clamping pins 22a.

In FIG. 6A, the lamp holder 30 is disposed rotated sixty degrees leftward from the longitudinal direction and includes a space 32 formed between the lamp-clamping pins 22b and 22c and between the lamp-clamping pins 22a and 22c at the end portion shown in the upper left portion of FIG. 6A, and a space 32 formed between the lamp-clamping pins 22a and 22c and between the lamp-clamping pins 22b and 22c at the end portion shown in the lower right portion of FIG. 6A, each space 32 being arranged such that a CCFL 5 is inserted and led therethrough. Thus, the CCFLs 5 that are inserted and led through the spaces 32 are clamped by the lamp-clamping pins 22a, 22b and 22c.

The distance between the spaces 32 is established to be equal to a predetermined interval P3, so that two CCFLs 5 to be inserted and led through the spaces 32 are held while arranged in parallel provided with the interval P3 therebetween.

In addition, in FIG. 6B, the lamp holder 30 is disposed rotated thirty degrees rightward from the longitudinal direction and includes a space 33 formed between the lamp-clamping pins 22a and 22b and between the lamp-clamping pins 22c and 22b at the end portion shown in the upper right portion of FIG. 6B, and a space 33 formed between the lamp-clamping pins 22c and 22b and between the lamp-clamping pins 22a and 22b at the end portion shown in the lower left portion of FIG. 6B, each space 33 being arranged such that a CCFL 14 that has a tube diameter larger than the CCFL 5 shown in FIG. 6A is inserted and led therethrough. Thus, the CCFLs 14 that are inserted and led through the spaces 33 are clamped by the lamp-clamping pins 22a, 22b and 22c.

In FIG. 6B, the distance between the spaces 33 is established to be equal to a predetermined interval P4 that is longer than the interval P3, so that two CCFLs 14 to be inserted and led through the spaces 33 are held while arranged in parallel provided with the interval P4 therebetween.

Figure 7A:
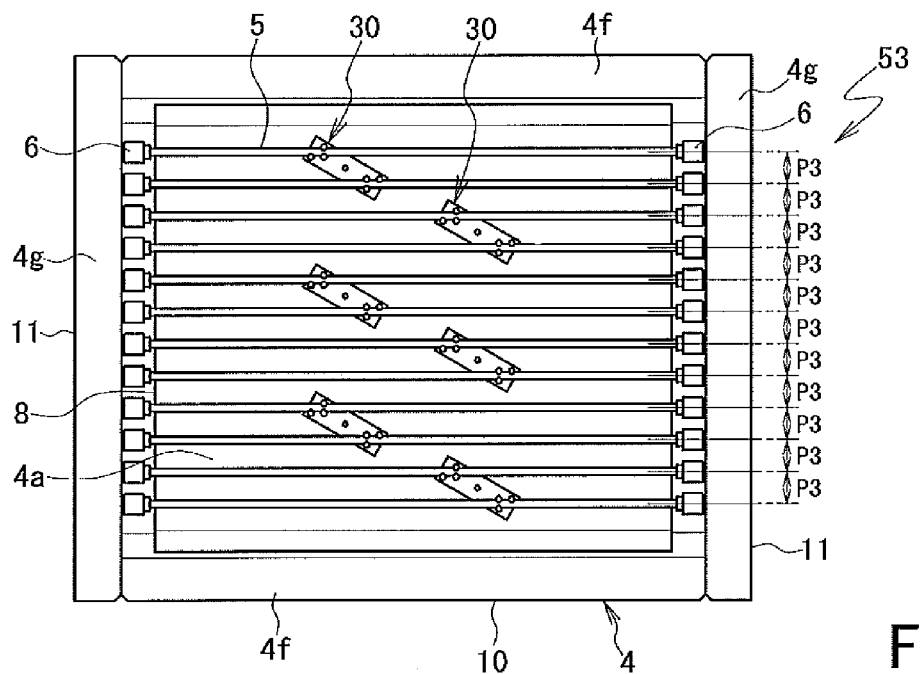
FIG. 7A is a front view of a backlight unit including the lamp holders shown in FIG. 6A, where the CCFLs are arranged in parallel provided with intervals P3 of a size therebetween.

A backlight unit 53 shown in FIG. 7A has a configuration such that the CCFLs 5 are arranged in parallel provided with the intervals P3 of a size therebetween, and all of the lamp holders 30 are disposed rotated sixty degrees leftward from the longitudinal direction.

Figure 7B:
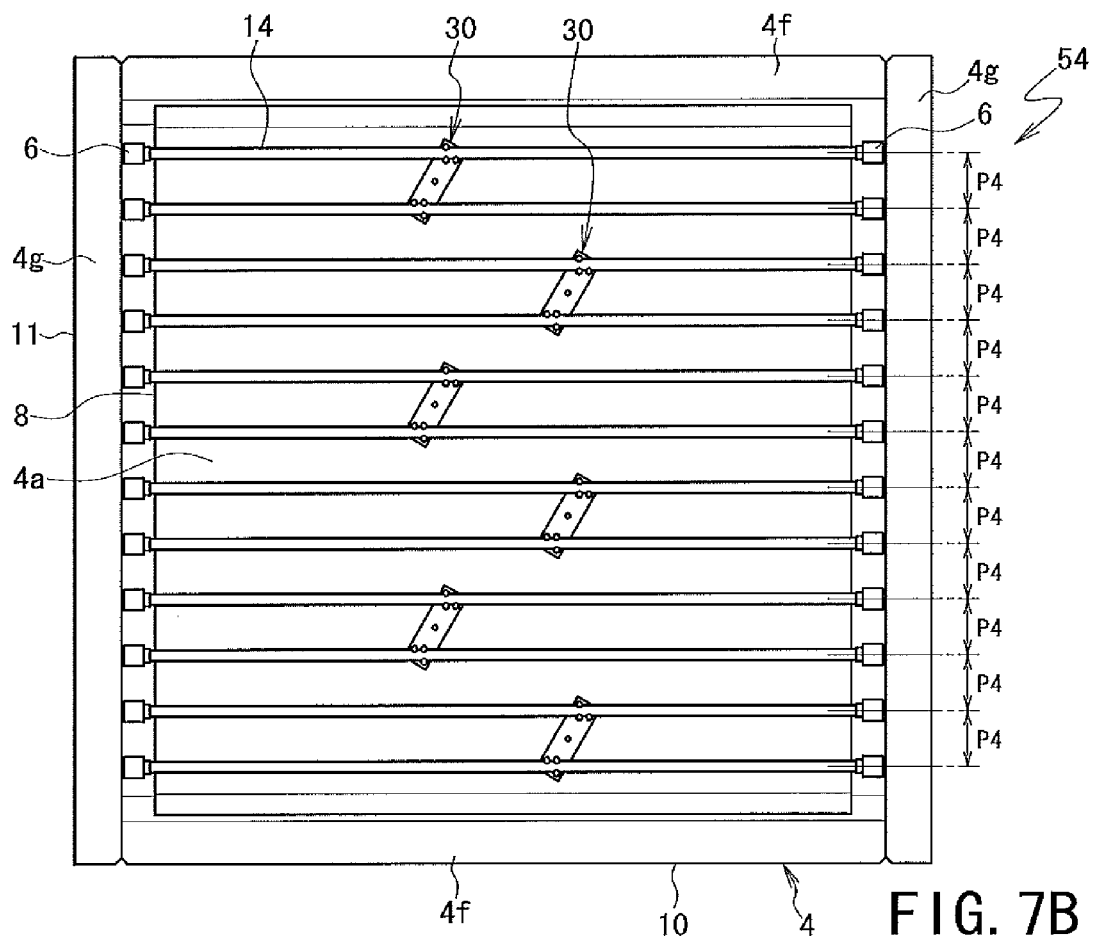
FIG. 7B is a front view of a backlight unit including the lamp holders shown in FIG. 6B, where the CCFLs are arranged in parallel provided with intervals P4 of a size therebetween.

A backlight unit 54 shown in FIG. 7B has a configuration such that the CCFLs 14 are arranged in parallel provided with the intervals P4 of a size therebetween, and all of the lamp holders 30 are disposed rotated thirty degrees rightward from the longitudinal direction.

The backlight unit 54 shown in FIG. 7B is larger in size than the backlight unit 53 shown in FIG. 7A, and the CCFLs 14 used in the backlight unit 54 have a tube diameter larger than the CCFLs 5.

Thus, the lamp holders 30 can be used in both of the backlight unit 53 shown in FIG. 7A having the configuration that the intervals P3 of a size are provided between the CCFLs 5, and the backlight unit 54 shown in FIG. 7B being larger in size than the backlight unit 53 shown in FIG. 7A, and having the configuration that the CCFLs 14 used therein have the tube diameter larger than the CCFLs 5 shown in FIG. 7A, and the configuration that the intervals P4 of a size are provided between the CCFLs 14. Consequently, the lamp holders 30 that are of a kind can be used in backlight units having configurations different from each other in the size of the intervals provided in the CCFLs, and in the tube diameter of the CCFLs, allowing manufacturing costs to be reduced.

Next, a description of a fourth preferred embodiment of the present invention will be provided referring to FIGS. 8A, 8B and 8C and FIG. 9. It is to be noted that, in this description, explanations of the same configurations as those in the first preferred embodiment are omitted, and different respects are explained mainly, providing the same reference numerals as those in the first preferred embodiment to the same components.

Figure 8A:
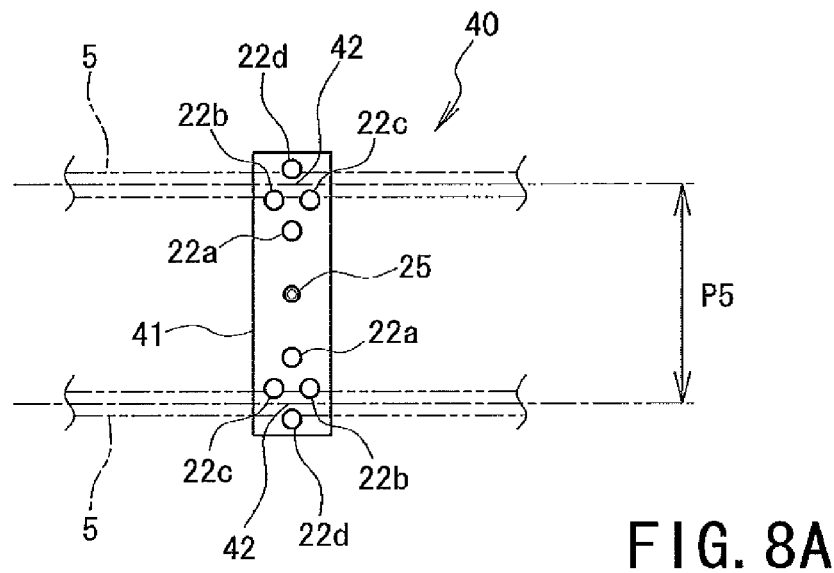
FIG. 8A is a front view of a lamp holder according to a fourth preferred embodiment of the present invention, where the lamp holder is configured to hold two CCFLs providing an interval P5 between them.
Figure 8B:
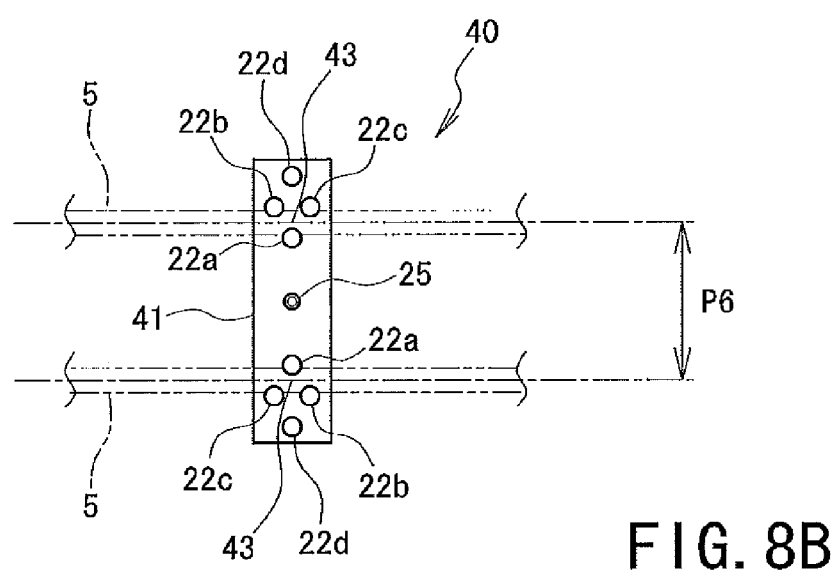
FIG. 8B is a front view of the lamp holder, where the lamp holder is configured to hold two CCFLs providing an interval P6 between them.
Figure 8C:
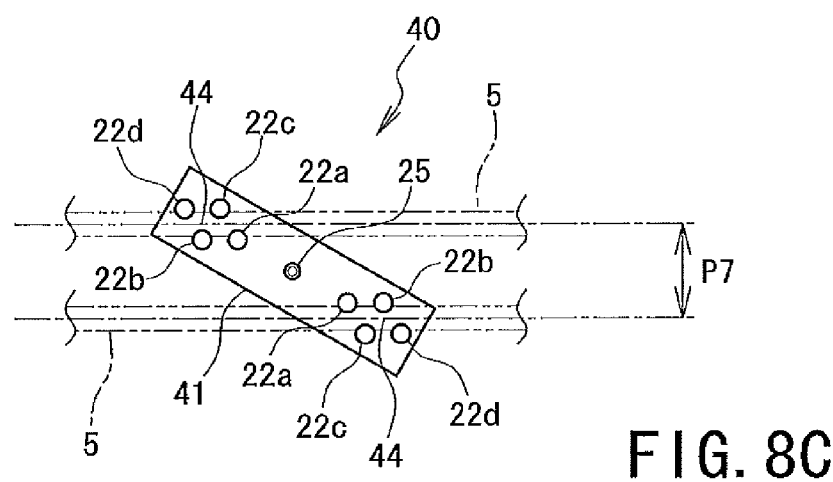
FIG. 8C is a front view of the lamp holder, where the lamp holder is configured to hold two CCFLs providing an interval P7 between them.

A lamp holder 40 shown in FIGS. 8A, 8B and 8C, which includes a holder board 41 having a rectangular shape, and four lamp-clamping pins 22a, 22b, 22c and 22d that are provided in a manner protruding upward at each end portion of the holder board 41, is different from the lamp holder 20 according to the first preferred embodiment of the present invention in terms of the number of the lamp-clamping pins. The lamp-clamping pins 22a, 22b, 22c and 22d at each end portion are located at the four vertices of a rhombus. In this case, the lamp-clamping pins 22a, 22b, 22c and 22d at one end portion and the lamp-clamping pins 22a, 22b, 22c and 22d at the other end portion are located symmetrical about the rotation center of the holder board 41. In this case, the lamp-clamping pins 22a, 22b, 22c and 22d at each end portion are located such that the longer diagonal of each rhombus is along the longitudinal direction of the holder board 41.

In FIG. 8A, the lamp holder 40 is disposed rotated ninety degrees to be in the longitudinal direction and includes a space 42 formed between the lamp-clamping pins 22b and 22d and between the lamp-clamping pins 22c and 22d at the end portion shown in the upper portion of FIG. 8A, and a space 42 formed between the lamp-clamping pins 22c and 22d and between the lamp-clamping pins 22b and 22d at the end portion shown in the lower portion of FIG. 8A, each space 42 being arranged such that a CCFL 5 is inserted and led therethrough. Thus, the CCFLs 5 that are inserted and led through the spaces 42 are clamped by the lamp-clamping pins 22b, 22c and 22d.

The distance between the spaces 42 is established to be equal to a predetermined interval P5, so that two CCFLs 5 to be inserted and led through the spaces 42 are held while arranged in parallel provided with the interval P5 therebetween.

In addition, in FIG. 8B, the lamp holder 40 is disposed rotated ninety degrees to be in the longitudinal direction and includes a space 43 formed between the lamp-clamping pins 22b and 22a and between the lamp-clamping pins 22c and 22a at the end portion shown in the upper portion of FIG. 8B, and a space 43 formed between the lamp-clamping pins 22c and 22a and between the lamp-clamping pins 22b and 22a at the end portion shown in the lower portion of FIG. 8B, each space 43 being arranged such that a CCFL 5 is inserted and led therethrough. Thus, the CCFLs 5 that are inserted and led through the spaces 43 are clamped by the lamp-clamping pins 22a, 22b and 22c.

In FIG. 8B, the distance between the spaces 43 is established to be equal to a predetermined interval P6 that is shorter than the interval P5, so that two CCFLs to be inserted and led through the spaces 43 are held while arranged in parallel provided with the interval P6 therebetween.

In FIG. 8C, the lamp holder 40 is disposed rotated sixty degrees leftward from the longitudinal direction and includes a space 44 formed between the lamp-clamping pins 22b and 22d and between the lamp-clamping pins 22a and 22c at the end portion shown in the upper left portion of FIG. 8C, and a space 44 formed between the lamp-clamping pins 22a and 22c and between the lamp-clamping pins 22b and 22d at the end portion shown in the lower right portion of FIG. 8C, each space 44 being arranged such that a CCFL 5 is inserted and led therethrough. Thus, the CCFLs 5 that are inserted and led through the spaces 44 are clamped by the lamp-clamping pins 22a, 22b, 22c and 22d.

In FIG. 8C, the distance between the spaces 44 is established to be equal to a predetermined interval P7 that is shorter than the interval P6, so that two CCFLs 5 to be inserted and led through the spaces 44 are held while arranged in parallel provided with the interval P7 therebetween.

Figure 9:
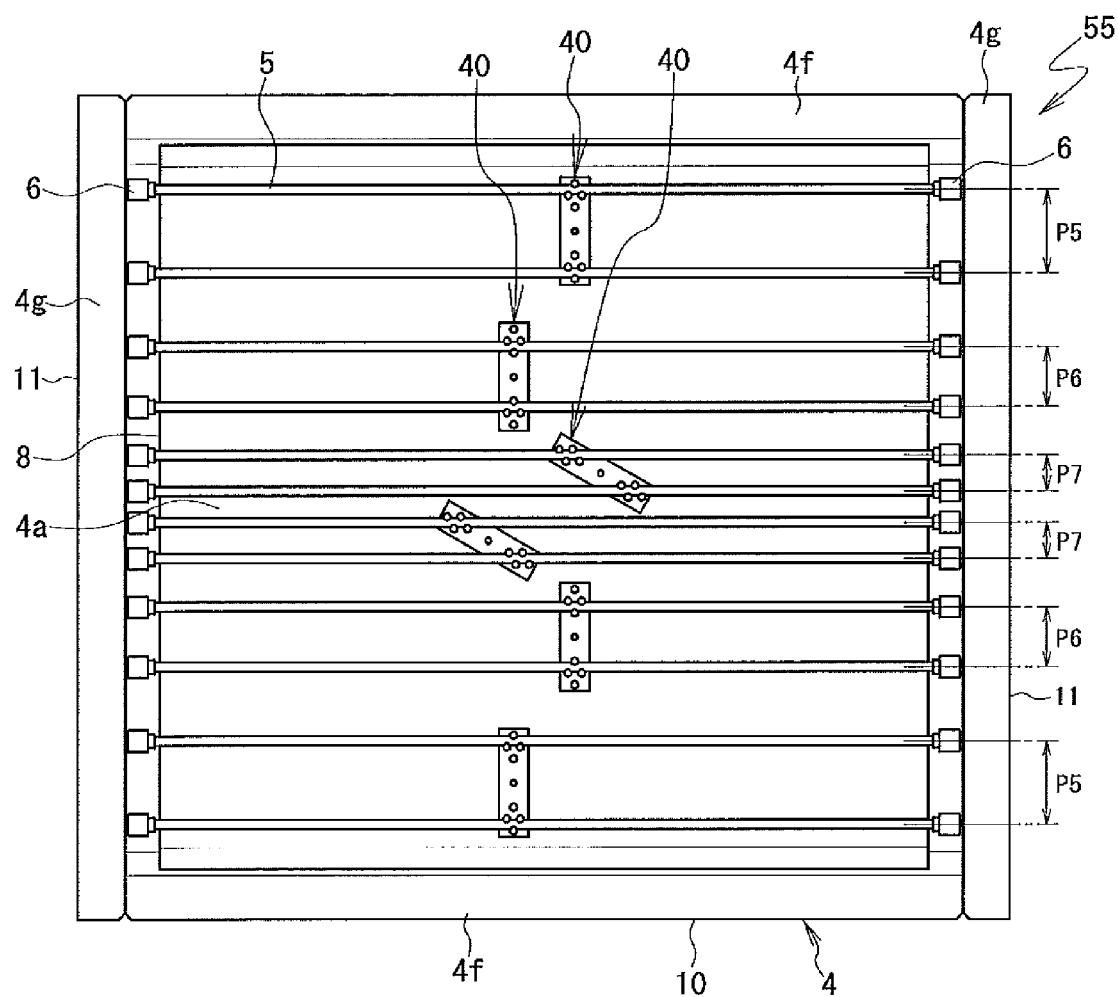
FIG. 9 is a front view of a backlight unit including the lamp holders shown in FIGS. 8A to 8C.
Figure 10:
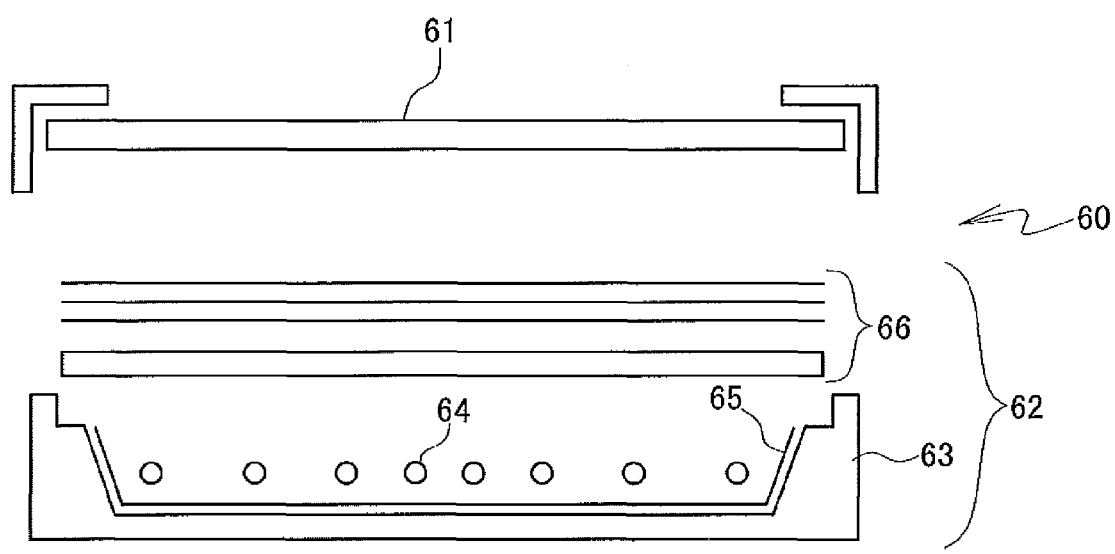
FIG. 10 is an exploded view showing a schematic configuration of a conventional liquid crystal display device.
Figure 11:
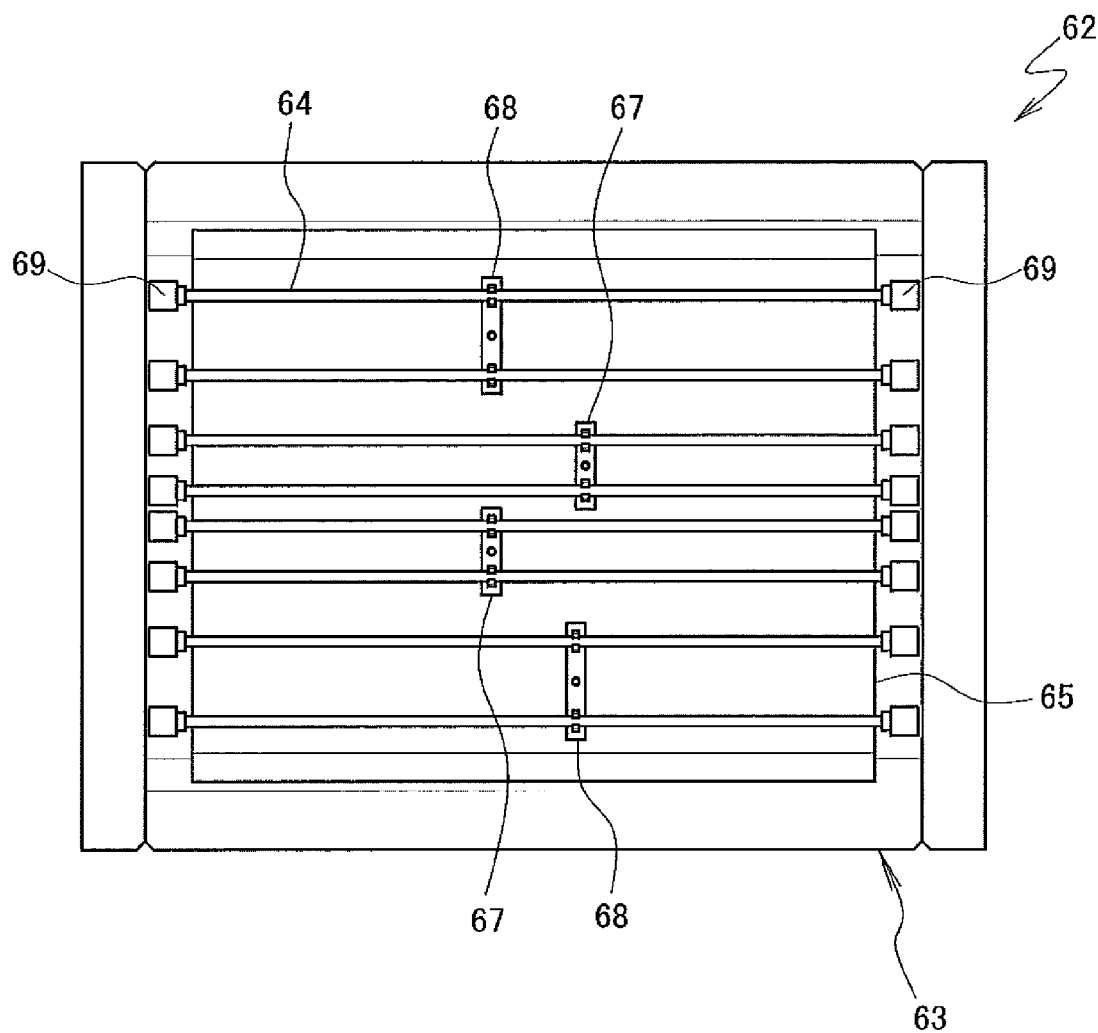
FIG. 11 is a front view of a backlight unit included in the conventional liquid crystal display device shown in FIG. 10.

Thus, by rotating the lamp holder 40 disposed on the lamp housing surface 4a ninety degrees to be in the longitudinal direction or sixty degrees leftward further from the longitudinal direction, a backlight unit 55 shown in FIG. 9 can have a configuration such that a pair of the CCFLs 5 that are first and second from the top end of the backlight unit 55 and a pair of the CCFLs 5 that are eleventh and twelfth from the top end are each held by the lamp holders 40 disposed rotated ninety degrees to be in the longitudinal direction while each pair is arranged in parallel provided with the interval 5 between the adjacent CCFLs 5, a pair of the CCFLs 5 that are third and fourth from the top end and a pair of the CCFLs 5 that are the ninth and tenth from the top end are each held by the lamp holders 40 disposed rotated ninety degrees to be in the longitudinal direction while each pair is arranged in parallel provided with the interval 6 between the adjacent CCFLs 5, and a pair of the CCFLs 5 that are fifth and sixth from the top end and a pair of the CCFLs 5 that are seventh and eighth from the top end are each held by the lamp holders 40 disposed rotated sixty degrees leftward from the longitudinal direction while each pair is arranged in parallel provided with the interval 7 between the adjacent CCFLs 5.

Therefore, since the lamp holders 40 can hold the CCFLs 5 while arranging them in parallel such that the intervals provided between the adjacent CCFLs 5 are narrow at the middle portion of the backlight chassis 4 and become gradually wider toward each top and bottom end of the backlight chassis 4, the use of the lamp holders 40 allows more detailed setting of intervals of various sizes between the CCFLs 5 in a case where many CCFLs 5 are used.

Conventionally, lamp holders of three different kinds are required to provide the configuration of the backlight unit 55 shown in FIG. 9; however, the above-described lamp holders 40 that are of one kind can suffice for the conventional lamp holders of three different kinds. Consequently, a reduction of the kinds of lamp holders can be achieved, allowing manufacturing costs to be reduced. It is to be noted that the lamp holders 40 according to the fourth preferred embodiment of the present invention can be used also in the backlight units 51 and 52 each including the CCFLs 5 arranged in parallel provided with the intervals of a size therebetween as shown in FIGS. 5A and 5B.

As described above, lamp holders of different kinds shown in FIGS. 12A and 12B are conventionally required to hold CCFLs while arranging them in parallel providing intervals of different sizes between the adjacent CCFLs; however, the above-described lamp holders according to the preferred embodiments of the present invention that are of one kind can suffice for the conventional lamp holders of different kinds. Consequently, a reduction of the kinds of lamp holders can be achieved, allowing manufacturing costs to be reduced more than ever.

The foregoing description of the preferred embodiments of the present invention has been presented for purposes of illustration and description with reference to the drawings. However, it is not intended to limit the present invention to the preferred embodiments, and modifications and variations are possible as long as they do not deviate from the principles of the present invention. For example, the present invention is not limited to the above-described shapes or location of the lamp-clamping pins provided in the protruding manner at each end portion of the holder boards of the lamp holders, and it is also preferable that the lamp-clamping pins have other shapes or location. In addition, the present invention is not limited to the tubular CCFLs (Cold Cathode Fluorescent Lamp), which are described above as one example of tubular lamps, and it is also preferable to use U-shaped CCFLs, or EEFLs (External Electrode Fluorescent Lamp) that include electrodes outside of glass tubes at the ends of the lamps.

What is claimed is:
1. A lamp holder for use mounted on a lamp housing surface having a flat shape to hold a plurality of tubular lamps that are a light source while arranging the tubular lamps in parallel on the lamp housing surface providing a predetermined interval between the lamps, the lamp holder comprising:
- a holder board; and
- three or more lamp-clamping pins that are provided in a protruding manner at each end portion of the holder board,
- the three or more lamp-clamping pins at each end portion of the holder board being disposed to have a positional relation such that they are capable of clamping the lamp that passes through them, and
- the lamp holder being arranged to provide, by being mounted at a variable rotation angle on the lamp housing surface, an interval of a desired size between the lamps.

2. The lamp holder according to claim 1, wherein the lamp holder comprises the three lamp-clamping pins provided in the protruding manner at each end portion of the holder board, and the three lamp-clamping pins at each end portion of the holder board are disposed to have a positional relation such that they are located at three vertices of a triangle.

3. The lamp holder according to claim 1, wherein the lamp holder comprises the four lamp-clamping pins provided in the protruding manner at each end portion of the holder board, and the four lamp-clamping pins at each end portion of the holder board are disposed to have a positional relation such that they are located at four vertices of a substantial rhombus.

4. The lamp holder according to claim 1, wherein the lamp-clamping pins each have an hourglass shape, and the lamp-clamping pins at each end portion of the holder board are arranged to clamp the lamp that passes through them at their hourglass waists.

5. The lamp holder according to claim 1, further comprising a mounting member via which the lamp holder is mounted on the lamp housing surface, the mounting member being disposed at a rotation center of the holder board.

6. A backlight unit for use disposed behind a display panel having an image display region to illuminate the display panel with light, the backlight unit comprising:
- a lamp housing surface having a flat shape;
- a plurality of tubular lamps that are a light source arranged in parallel on the lamp housing surface; and
- a lamp holder that is mounted on the lamp housing surface and arranged to hold the plurality of tubular lamps while arranging the tubular lamps in parallel on the lamp housing surface providing a predetermined interval between the lamps, the lamp holder comprising:
- a holder board; and
- three or more lamp-clamping pins that are provided in a protruding manner at each end portion of the holder board,
- the three or more lamp-clamping pins at each end portion of the holder board being disposed to have a positional relation such that they are capable of clamping the lamp that passes through them, and
- the lamp holder being arranged to provide, by being mounted at a variable rotation angle on the lamp housing surface, an interval of a desired size between the lamps.

7. The backlight unit according to claim 6, wherein the lamp holder comprises the three lamp-clamping pins provided in the protruding manner at each end portion of the holder board, and the three lamp-clamping pins at each end portion of the holder board are disposed to have a positional relation such that they are located at three vertices of a triangle.

8. The backlight unit according to claim 6, wherein the lamp holder comprises the four lamp-clamping pins provided in the protruding manner at each end portion of the holder board, and the four lamp-clamping pins at each end portion of the holder board are disposed to have a positional relation such that they are located at four vertices of a substantial rhombus.

9. The backlight unit according to claim 6, wherein the lamp-clamping pins each have an hourglass shape, and are arranged to clamp the lamp that passes through them at their hourglass waists.

10. The backlight unit according to claim 6, wherein the lamp holder further comprises a mounting member via which the lamp holder is mounted on the lamp housing surface, the mounting member being disposed at a rotation center of the holder board.

11. A display device comprising:
- a display panel having an image display region; and
- a backlight unit that is disposed behind the display panel and arranged to illuminate the display panel with light, the backlight unit comprising:
- a lamp housing surface having a flat shape;
- a plurality of tubular lamps that are a light source arranged in parallel on the lamp housing surface; and
- a lamp holder that is mounted on the lamp housing surface and arranged to hold the plurality of tubular lamps while arranging the tubular lamps in parallel on the lamp housing surface providing a predetermined interval between the lamps, the lamp holder comprising:
- a holder board; and
- three or more lamp-clamping pins that are provided in a protruding manner at each end portion of the holder board,
- the three or more lamp-clamping pins at each end portion of the holder board being disposed to have a positional relation such that they are capable of clamping the lamp that passes through them, and
- the lamp holder being arranged to provide, by being mounted at a variable rotation angle on the lamp housing surface, an interval of a desired size between the lamps.

12. The display device according to claim 11, wherein the lamp holder comprises the three lamp-clamping pins provided in the protruding manner at each end portion of the holder board, and the three lamp-clamping pins at each end portion of the holder board are disposed to have a positional relation such that they are located at three vertices of a triangle.

13. The display device according to claim 11, wherein the lamp holder comprises the four lamp-clamping pins provided in the protruding manner at each end portion of the holder board, and the four lamp-clamping pins at each end portion of the holder board are disposed to have a positional relation such that they are located at four vertices of a substantial rhombus.

14. The display device according to claim 11, wherein the lamp-clamping pins each have an hourglass shape, and are arranged to clamp the lamp that passes through them at their hourglass waists.

15. The display device according to claim 11, wherein the lamp holder further comprises a mounting member via which the lamp holder is mounted on the lamp housing surface, the mounting member being disposed at a rotation center of the holder board.

* * * * *